United States Patent
Suzuki et al.

(10) Patent No.: US 10,060,542 B2
(45) Date of Patent: Aug. 28, 2018

(54) LEVELING VALVE (71) Applicant: KAYABA INDUSTRY CO., LTD., Tokyo (JP)

(72) Inventors: Tsutomu Suzuki, Kanagawa (JP); Yusuke Endo, Kanagawa (JP)

(73) Assignee: KYB Corporation, Tokyo (JP)

( * ) Notice: Subject to any disclaimer, the term of this patent is extended or adjusted under 35 U.S.C. 154(b) by 475 days.

(21) Appl. No.: 14/440,365

(22) PCT Filed: Dec. 17, 2013

(86) PCT No.: PCT/JP2013/083730
§ 371 (c)(1),
(2) Date: May 4, 2015

(87) PCT Pub. No.: WO2014/132529
PCT Pub. Date: Sep. 4, 2014

(65) Prior Publication Data
US 2015/0285388 A1 Oct. 8, 2015

(30) Foreign Application Priority Data

Feb. 28, 2013 (JP) ................................. 2013-038978

(51) Int. Cl.
F16K 15/20 (2006.01)
F16K 11/16 (2006.01)
F16K 11/18 (2006.01)
B61F 5/24 (2006.01)

(52) U.S. Cl.
CPC ............... F16K 15/20 (2013.01); B61F 5/24 (2013.01); F16K 11/168 (2013.01); F16K 11/18 (2013.01); Y10T 137/3584 (2015.04)

(58) Field of Classification Search
USPC ...................................................... 137/636.1
See application file for complete search history.

(56) References Cited

U.S. PATENT DOCUMENTS

| 3,596,679 | A | * | 8/1971 | Sugden, Jr. | ......... F15B 13/0402 137/595 |
| 6,382,371 | B1 | | 5/2002 | Oliver et al. | |
| 2003/0000587 | A1 | | 1/2003 | Sulzye et al. | |

FOREIGN PATENT DOCUMENTS

| GB | 931547 A | 7/1963 |
| JP | 48-035964 B1 | 10/1973 |
| JP | 49-062865 A | 6/1974 |

(Continued)

Primary Examiner — John K Fristoe, Jr.
Assistant Examiner — Daphne M Barry
(74) Attorney, Agent, or Firm — Rabin & Berdo, P.C.

(57) ABSTRACT

A leveling valve includes: a seat portion configured to define a flow passage, the flow passage communicating with the air cushion and a compressed air source or communicating with the air cushion and a drain; a valve configured to move in an axial direction in accordance with a relative displacement of the vehicle body with respect to the truck; a spring configured to bias the valve toward a closing side, the valve being in contact with the seat portion in the closing side; a valve guide configured to support one end of the spring, the valve guide being slidably inserted with respect to a housing inner wall surface; and a communication port opened to the housing inner wall surface. A moving region in which the valve guide moves is set to a position offset from the communication port in the axial direction.

8 Claims, 9 Drawing Sheets (56) References Cited

FOREIGN PATENT DOCUMENTS

| | | |
|---|---|---|
| JP | 06-156041 A | 6/1994 |
| JP | 07-023605 U | 5/1995 |
| JP | 09-020123 A | 1/1997 |
| JP | 2007-076480 A | 3/2007 |
| JP | 2012-031932 A | 2/2012 |

* cited by examiner

FIG. 9

US 10,060,542 B2

LEVELING VALVE

TECHNICAL FIELD

The prevent invention relates to a leveling valve.

BACKGROUND ART

JP2007-076480A discloses a railway vehicle provided with a lever and a leveling valve. The lever rotates in accordance with a relative displacement of a vehicle body with respect to a truck. The leveling valve is composed of an intake valve and an exhaust valve that are selectively opened or closed by the rotation of the lever.

In a case where the vehicle body is at a predetermined height with respect to the truck, the lever is at a neutral position, and both the intake valve and the exhaust valve of the leveling valve are kept in a closed state, whereby an air cushion is blocked from a compressor and a drain. If a load of the vehicle body increases and the vehicle body thus sinks with respect to the truck, the intake valve is opened in accordance with the rotation of the lever and compressed air is supplied from the compressor to the air cushion to elevate the vehicle body. If the load of the vehicle body decreases and the vehicle body is lifted with respect to the truck, the exhaust valve is opened in accordance with the rotation of the lever and the compressed air of the air cushion is discharged to the atmosphere to lower the vehicle body.

The leveling valve includes: a valve body that moves in an axial direction in accordance with the rotation of the lever; a spring that biases the valve body toward a closing side; a valve guide coupled to the valve body to support one end of the spring; and a housing that houses the valve body, the spring and the valve guide therein.

A housing inner wall portion (guide wall) along which the valve guide slides is formed in the housing, and a communication port that communicates with the compressor is opened on the housing inner wall portion.

SUMMARY OF INVENTION

However, in the conventional leveling valve described above, an outer peripheral part of the valve guide, which is sliding in contact with the housing inner wall portion, may interfere with an opening end of the communication port and the valve body may not be opened or closed smoothly at the time of opening and closing operations in which the valve body and the valve guide move in the axial direction.

It is an object of the present invention to provide a leveling valve in which a valve body can be opened and closed smoothly.

According to an aspect of the present invention, there is provided a leveling valve for adjusting a height of an air cushion, the air cushion being provided between a vehicle body and a truck of a vehicle. The leveling valve includes: a seat portion configured to define a flow passage, the flow passage communicating with the air cushion and a compressed air source or communicating with the air cushion and a drain; a valve configured to move in an axial direction in accordance with a relative displacement of the vehicle body with respect to the truck; a spring configured to bias the valve toward a closing side, the valve being in contact with the seat portion in the closing side; a valve guide configured to support one end of the spring, the valve guide being slidably inserted with respect to a housing inner wall surface; and a communication port opened to the housing inner wall surface, wherein a moving region in which the valve guide moves is set to a position offset from the communication port in the axial direction.

DESCRIPTION OF EMBODIMENTS

Hereinafter, embodiments of the present invention will be described with reference to the accompanying drawings.

First, a first embodiment will be described.

Figure 1:
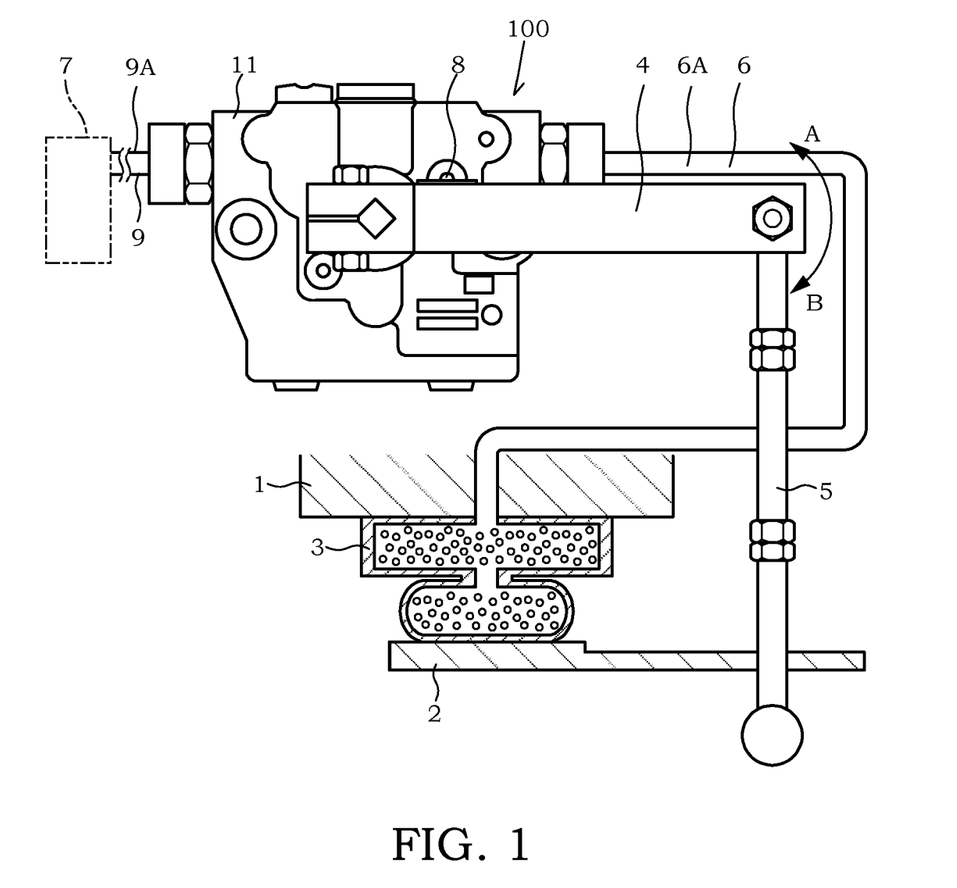
FIG. 1 is a view showing a mounted state of a leveling valve according to a first embodiment of the present invention.

FIG. 1 is a view showing a mounted state of a leveling valve 100 according to the present embodiment.

The leveling valve 100 maintains a vehicle body 1 at a constant height by adjusting a height of an air cushion 3 disposed between the vehicle body 1 and a truck 2 of a roadway vehicle.

The leveling valve 100 is mounted between the vehicle body 1 and the truck 2. The leveling valve 100 is attached to the vehicle body 1 and coupled to the truck 2 via a lever 4 and a coupling rod 5. When the height of the vehicle body 1 is changed by extending or compressing the air cushion 3 due to a load change of the vehicle body 1, this change is transmitted to the leveling valve 100 via the coupling rod 5 and the lever 4.

In a case where the vehicle body 1 is at a predetermined height with respect to the truck 2, the lever 4 is at a neutral position and both an intake valve 31 (see FIG. 2) and an exhaust valve 32 (see FIG. 2) in the leveling valve 100 are kept in a valve closed state. This causes an air cushion passage 6 communicating with the air cushion 3 to be blocked from a compressor (compressed air source) 7 and a drain (outside), whereby the air cushion 3 is kept at a constant height.

In a case where a vehicle body load increases to deflect the air cushion 3, the lever 4 is pushed upward from the neutral position and rotated in a direction of an arrow A in FIG. 1. Associated with this, the intake valve 31 (see FIG. 2) of the leveling valve 100 is opened. This causes the air cushion passage 6 and the compressor 7 to communicate, whereby compressed air from the compressor 7 is supplied to the air cushion 3. Thereafter, when the air cushion 3 returns to the constant height, the lever 4 returns to the neutral position to close the intake valve 31, and this causes the supply of the compressed air to be cut off.

On the other hand, in a case where the vehicle body load decreases to extend the air cushion 3, the lever 4 is pulled downward from the neutral position and rotated in a direction of an arrow B in FIG. 1. Associated with this, the exhaust valve 32 (see FIG. 2) of the leveling valve 100 is opened. This causes the air cushion passage 6 to be communicated with an exhaust passage 8, whereby the compressed air of the air cushion 3 is discharged to the atmosphere. Thereafter, when the air cushion 3 returns to the constant height, the lever 4 returns to the neutral position to close the exhaust valve 32, and this causes the discharge of the compressed air to be cut off.

In this way, the leveling valve 100 maintains the vehicle body 1 at the constant height by automatically adjusting a relative displacement generated between the vehicle body 1 and the truck 2.

Next, the leveling valve 100 will be described in detail mainly with reference to FIGS. 2 to 5.

Figure 2:
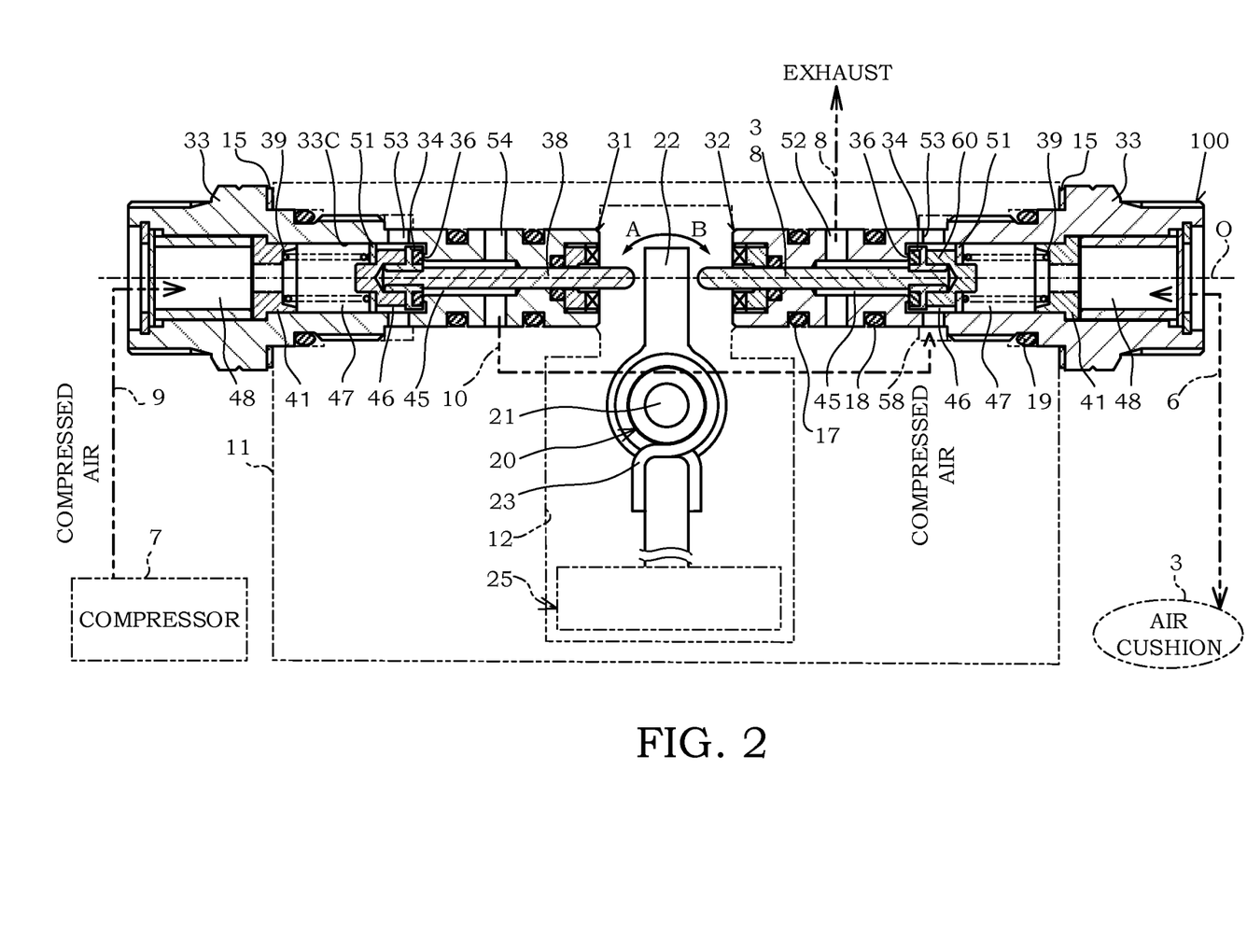
FIG. 2 is a cross-sectional view of the leveling valve according to the first embodiment of the present invention.

As shown in FIG. 2, the leveling valve 100 includes: a damping spring unit 20 arranged in a central part; the intake valve 31 and the exhaust valve 32 arranged in an upper part; and a damper 25 arranged in a lower part.

The damping spring unit 20 includes: a swing arm (not shown in the drawings) fixed to a shaft 21; an operating arm 22 rotatably provided with respect to the shaft 21; and a damping spring 23 incorporated concentrically with the shaft 21 and arranged to be simultaneously in contact with the swing arm and the operating arm 22 in a state where an initial load is applied. The rotation of the lever 4 is transmitted to the operating arm 22 via the swing arm and the damping spring 23. That is, the operating arm 22 rotates with the rotation of the lever 4.

The intake valve 31 and the exhaust valve 32 are arranged symmetrically with respect to a tip side of the operating arm 22 as a center, and are housed in a valve case 11 (see FIG. 1). Since a dead zone in which the supply and discharge of the compressed air to and from the air cushion 3 are prohibited is provided in the leveling valve 100, there are respective gaps between the operating arm 22 and the intake valve 31 and the exhaust valve 32 so that the intake valve 31 and the exhaust valve 32 are not immediately opened even if the operating arm 22 rotates from a neutral position. Since this prevents the compressed air from being supplied to and discharged from the air cushion 3 in response to the rotation of the operating arm 22 with a predetermined angle or less, it is possible to prevent the hunting of the intake valve 31 and the exhaust valve 32.

The damper 25 includes a piston (not shown in the drawings), which is coupled to a base end side of the operating arm 22. The piston moves with the rotation of the operating arm 22. The piston is arranged so as to be immersed in an oil chamber 12 that is formed in the valve case 11. The piston applies resistance to a rotational movement of the operating arm 22 when the operating arm 22 rotates from the neutral position. On the other hand, the piston applies almost no resistance to the operating arm 22 when the operating arm 22 returns to the neutral position.

Next, the intake valve 31 and the exhaust valve 32 will be described.

Since a structure and a shape of the intake valve 31 are identical to those of the exhaust valve 32, the exhaust valve 32 will be mainly described below. It should be noted that the same components in the intake valve 31 and the exhaust valve 32 are denoted by the same reference numerals.

Figure 3:
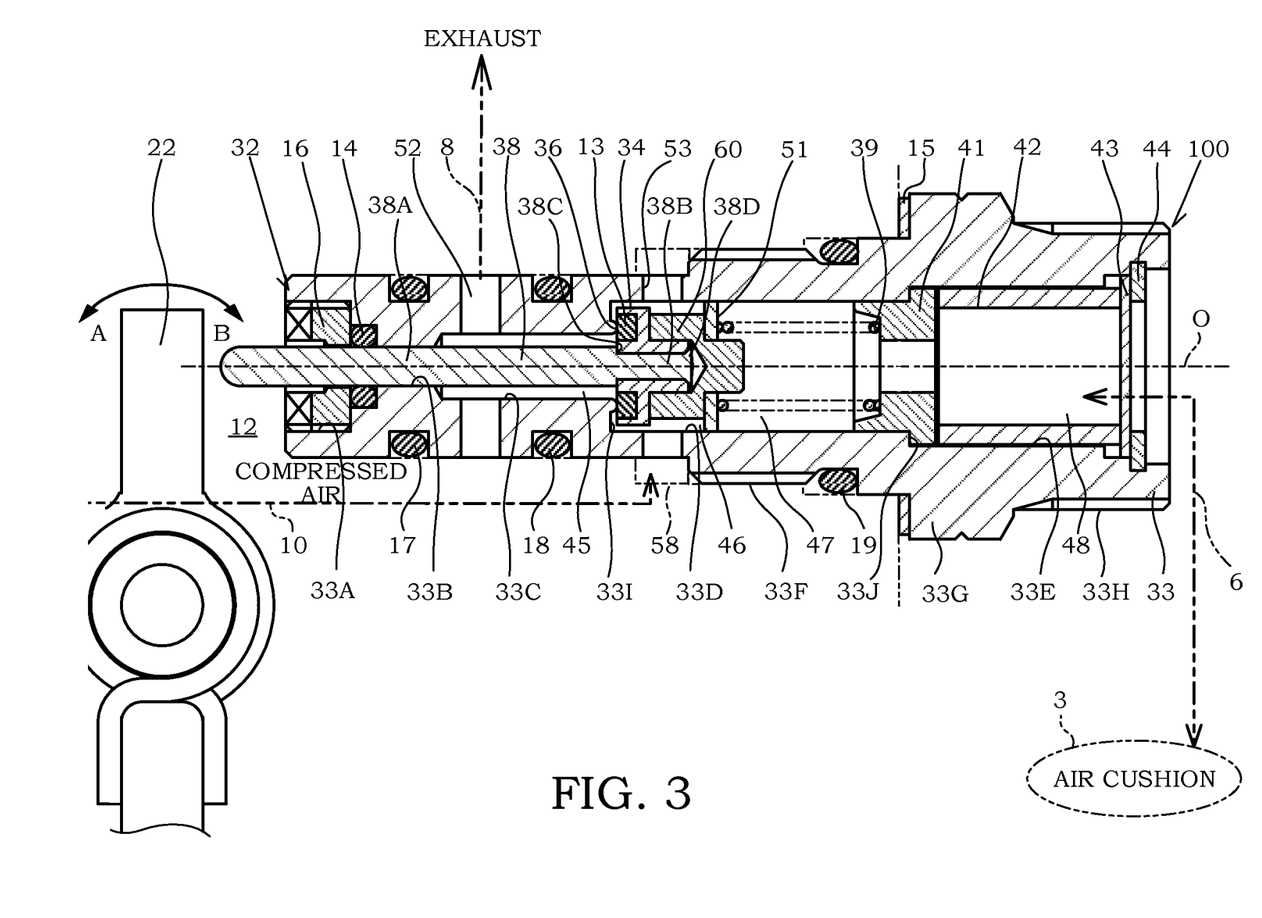
FIG. 3 is a cross-sectional view of an exhaust valve of the leveling valve according to the first embodiment of the present invention.

The exhaust valve 32 includes: a hollow cylindrical housing 33 attached to the valve case 11; a seat portion 36 configured to define a flow passage provided in the housing 33; a rod 38 configured to move in the axial direction with the rotation of the operating arm 22; a valve 34 coupled to the rod 38; a spring 39 configured to bias the valve 34 toward a closing side in which the valve 34 is in contact with the seat portion 36; a valve guide 51 coupled to the valve 34 and configured to support one end of the spring 39; and a spring receiving member 41 configured to support the other end of the spring 39.

Figure 4:
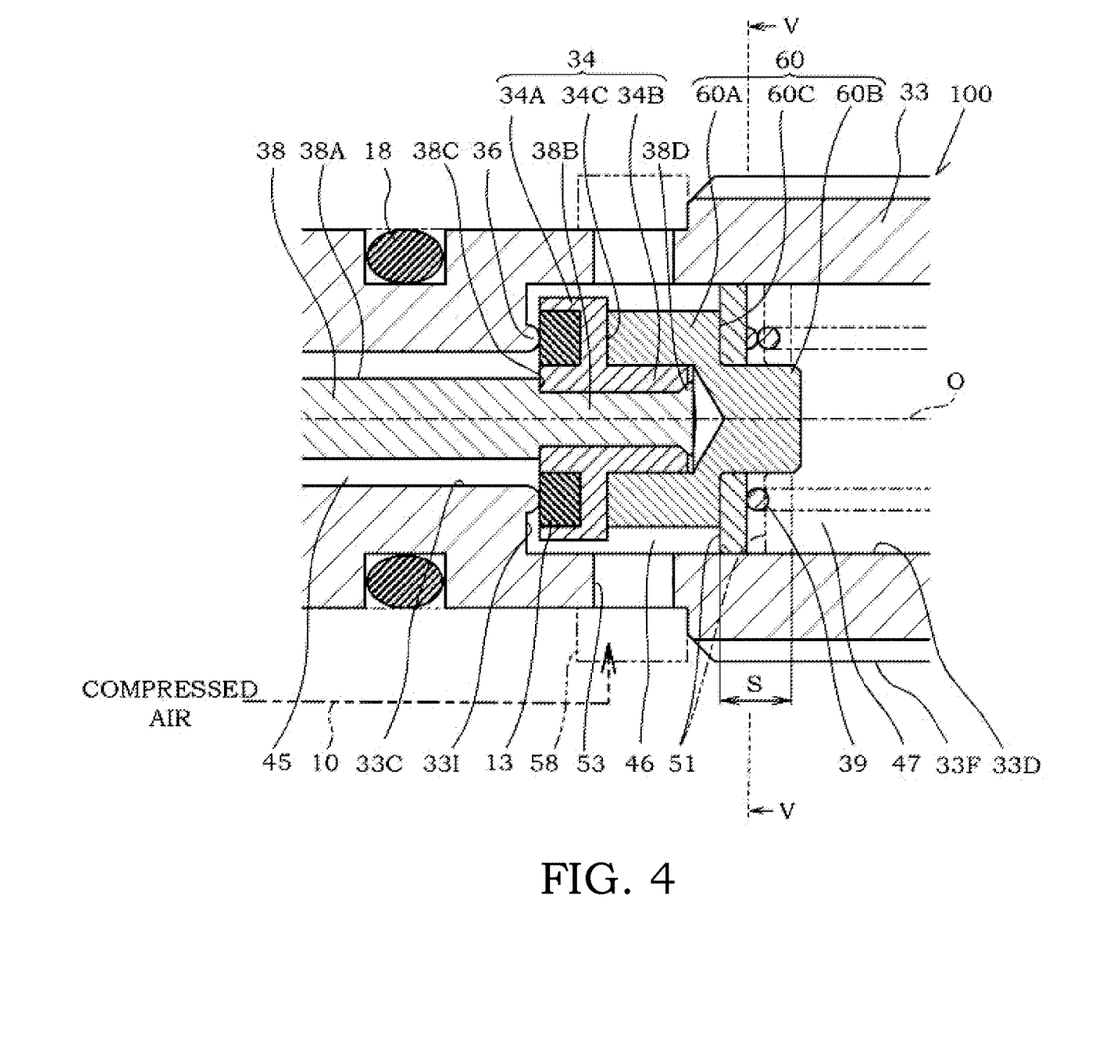
FIG. 4 is an enlarged cross-sectional view showing a part of the exhaust valve of the leveling valve according to the first embodiment of the present invention.

In FIGS. 2 to 4, "O" denotes center axes of the housing 33 and the valve 34. It should be noted that, in the following description, a radial direction centered on the center axis O is referred to as a "radial direction", an extending direction of the center axis O is referred to as an "axial direction", and an inner side in the radial direction is referred to as an "inner side".

A male threaded portion 33F (see FIG. 3) is formed on a part of an outer peripheral surface of the housing 33. The housing 33 is coupled to the valve case 11 by threadably engaging the male threaded portion 33F with a female threaded portion (not shown in the drawings) formed in the valve case 11. A flange portion 33G (see FIG. 3) extending in the radial direction is formed on an outer periphery of the housing 33. The housing 33 is positioned in the valve case 11 by causing the flange portion 33G to bring into contact with an end surface of the valve case 11 via a washer 15.

O-rings 17 to 19 are interposed between the housing 33 and the valve case 11 to seal each passage 6, 8, 10 (will be described later).

A threaded portion 33H is formed on an outer periphery of a projecting part of the housing 33 from the valve case 11. A pipe 6A (see FIG. 1) of the air cushion passage 6 is fastened to the threaded portion 33H (see FIG. 3) of the exhaust valve 32. A pipe 9A (see FIG. 1) of a supply passage 9 communicating with the compressor 7 is fastened to a threaded portion 33H of the intake valve 31.

As shown in FIG. 3, a first hole 33A, a second hole 33B having a smaller diameter than that of the first hole 33A, a third hole 33C having a larger diameter than that of the second hole 33B, a fourth hole 33D having a larger diameter than that of the third hole 33C and a fifth hole 33E having a larger diameter than that of the fourth hole 33D are formed in the housing 33 so as to be arranged in series from the side of the oil chamber 12 while being centered on the center axis O.

The rod 38 is inserted slidably along an inner peripheral surface of the second hole 33B of the housing 33. This causes the rod 38 to be guided concentrically with the center axis O.

A tip part of the rod 38 projects into the oil chamber 12. In a state where the valve 34 is in contact with the seat portion 36, the tip part of the rod 38 is facing the operating arm 22 with a predetermined gap defined therebetween. When the operating arm 22 is rotated by a predetermined angle or larger from the neutral position, the operating arm 22 comes into contact with the tip part of the rod 38. The valve 34 moves against a biasing force of the spring 39 with the rotation of the operating arm 22 and is separated from the seat portion 36 to be opened.

An O-ring 14 is disposed in a boundary portion between the first hole 33A and the second hole 33B of the housing 33. The O-ring 14 seals between the inner peripheral surface of the second hole 33B and the rod 38.

A ring-shaped plug 16 is threadably engaged with and fastened to the first hole 33A of the housing 33. The O-ring 14 is retained by the plug 16.

A first air chamber 45, a second air chamber 46, a third air chamber 47 and a fourth air chamber 48 are provided in the housing 33. The first air chamber 45 is defined by the third hole 33C, the rod 38 and the valve 34. The second air chamber 46 is defined by the fourth hole 33D, the valve 34, a cap 60 and the valve guide 51. The third air chamber 47 is defined by the fourth hole 33D, the valve guide 51 and the spring receiving member 41. The fourth air chamber 48 is defined by a sleeve 42 and the like disposed in the fifth hole 33E.

The second, third and fourth air chambers 46, 47 and 48 constantly communicate with the air cushion 3 through the air cushion passage 6.

A drain port 52 is formed in housing 33. The drain port 52 is opened on the first air chamber 45. The drain port 52 constantly communicates with the outside (drain) through the exhaust passage 8 formed in the valve case 11.

A communication port 53 is formed in the housing 33. The communication port 53 is opened on the second air chamber 46. The communication port 53 constantly communicates with a supply port 54 (see FIG. 2) formed in a housing 33 of the intake valve 31 through an annular groove 58 formed in the valve case 11 and a communication passage 10.

On the other hand, in the intake valve 31, a second air chamber 46, a third air chamber 47 and a fourth air chamber 48 constantly communicate with the compressor 7 through the support passage 9 as shown in FIG. 2. A communication port 53 formed in the housing 33 of the intake valve 31 is closed by the valve case 11.

When the intake valve 31 is opened, the compressed air supplied from the compressor 7 is introduced to the communication port 53 of the exhaust valve 32 from the supply port 54 through the communication passage 10 and the annular groove 58 of the valve case 11. A check valve (not shown in the drawings) for permitting only a flow of the compressed air from the supply port 54 of the intake valve 31 to the communication port 53 of the exhaust valve 32 is provided in the middle of the communication passage 10.

The communication port 53 needs to be formed in an inner peripheral surface of the fourth hole 33D of the housing 33 so as to avoid the male threaded portion 33F of the housing 33. Similarly, the annular groove 58 opened on an inner wall of the valve case 11 also needs to be formed so as to avoid the female threaded portion (not shown in the drawings) threadably engaged with the male threaded portion 33F. Thus, the communication port 53 cannot be opened on the third air chamber 47 provided in the male threaded portion 33F, and the communication port 53 has to be opened in the vicinity of the valve 34 in the second air chamber 46.

The seat portion 36 annularly projects in the axial direction from a bottom portion (step portion) 331 of the fourth hole 33D of the housing 33. An inner peripheral surface of the seat portion 36 is connected to an inner peripheral surface of the third hole 33C without forming any step.

The rod 38 includes a solid cylindrical large-diameter portion 38A and a solid cylindrical small-diameter potion 38B thinner than the large-diameter portion 38A. The large-diameter portion 38A slides along the second hole 33B of the housing 33. The small-diameter portion 38B is coupled to the valve 34.

As shown in FIG. 4, the valve 34 includes a hollow cylindrical coupling portion 34B and a disk-shaped valve body portion 34A. The cylindrical coupling portion 34B is coupled to the small-diameter portion 38B of the rod 38. The disk-shaped valve body portion 34A comes into contact with and is separated from the seat portion 36.

An inner periphery of the coupling portion 34B of the valve 34 is fitted to the small-diameter portion 38B of the rod 38. One end of the coupling portion 34B comes into contact with a step portion 38C of the rod 38, and the other end thereof is caulked and fixed by a base-end caulking portion 38D of the rod 38.

It this regard, there is no limitation to the configuration described above, and the rod 38 and the valve 34 may be integrally formed.

An annular packing 13 is disposed in the valve body portion 34A. By the contact of the packing 13 with the seat portion 36, sealability between the valve body portion 34A and the seat portion 36 is ensured.

In this regard, there is no limitation to the configuration described above, and the packing 13 may be omitted and an end surface of the valve body portion 34A may come into contact with the seat portion 36.

The ring-shaped spring receiving member 41 is provided so as to be engaged with a step portion 33J. The step portion 33J is formed on a boundary between the fourth and fifth holes 33D, 33E (see FIG. 3) of the housing 33. The spring receiving member 41 is fixed via the sleeve 42, a porous plate 43, and a snap ring 44.

The coil-shaped spring 39 is interposed in a compressed state between the spring receiving member 41 and the valve guide 51 coupled to the valve 34. The spring 39 functions as a biasing member for biasing the valve 34 in a valve closing direction in which the valve 34 is brought into contact with the seat portion 36. The valve guide 51 functions as a transmitting member for transmitting a spring force of the spring 39 to the valve 34.

Figure 5:
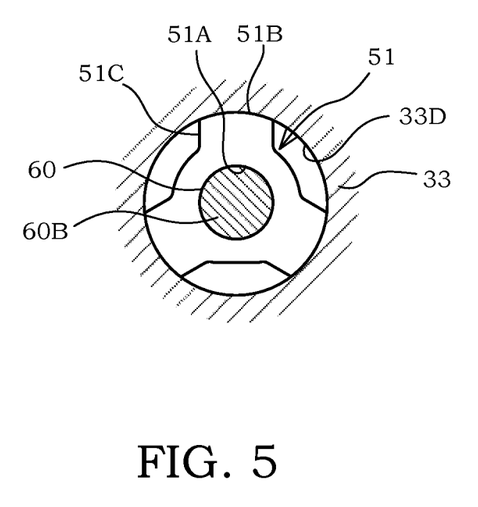
FIG. 5 is a cross-sectional view taken along V-V of FIG. 4.

The valve guide 51 is a ring-shaped member, and formed by punching a flat plate into a ring shape, for example. As shown in FIG. 5, the valve guide 51 includes a coupling hole 51A, an outer peripheral portion 51B, and a plurality of notches 51C. The coupling hole 51A is fitted to a coupling shaft portion 60B of the cap 60 (will be described later). The outer peripheral portion 51B slides along the fourth hole 33D of the housing 33. The plurality of notches 51C is opened on the outer peripheral portion 51B. A flow passage in which air supplied to and discharged from the air cushion 3 flows is defined between the notches 51C and the fourth hole 33D of the housing 33.

The valve guide 51 is slidably inserted into the fourth hole 33D of the housing 33. The fourth hole 33D is formed so that an inner diameter thereof is larger than an outer diameter of the valve guide 51, whereby a predetermined gap is formed between the outer peripheral portion 51B of the valve guide 51 and the fourth hole 33D. This causes the inner peripheral surface of the fourth hole 33D to function as a housing inner wall surface (guide wall) for guiding a movement of the valve guide 51 in the axial direction.

When the exhaust valve 32 is opened or closed, the valve guide 51 moves in the axial direction while the outer peripheral portion 51B slides in contact with the fourth hole 33D. This causes the valve guide 51 to function as a supporting member for supporting the valve 34 so that the valve 34 is located concentrically with the center axis O.

In FIG. 4, the valve guide 51 located at a valve closing position is shown by a solid line and the valve guide 51 located at a valve opening position is shown by a chain double-dashed line. The outer peripheral portion 51B of the valve guide 51 moves in a range of a moving region S along the inner peripheral surface of the fourth hole 33D.

In order to avoid the outer peripheral portion 51B of the valve guide 51 sliding in contact with the inner peripheral surface of the fourth hole 33D from interfering with the communication port 53, the cap 60 as a valve guide separating mechanism for separating the valve body portion 34A of the valve 34 from the valve guide 51 in the axial direction is interposed between the valve 34 and the valve guide 51. The moving region S is set to a position offset from the communication port 53 in the axial direction.

By interposing the cap 60 between the valve 34 and the valve guide 51, the valve guide 51 is located at a distant position on a side opposite to the seat portion 36 (right side in FIGS. 2 to 4). The moving region S in which the outer peripheral portion 51B of the valve guide 51 moves is set at a position separated from an opening end of the communication port 53 in the axial direction by arbitrarily setting an axial length of a coupling tube portion 60A of the cap 60.

In a case where the valve 34 is located at the valve closing position where the valve 34 is in contact with the seat portion 36, the communication port 53 faces an outer periphery of the valve body portion 34A of the valve 34 and an outer periphery of the cap 60.

The cap 60 includes the coupling tube portion 60A coupled to the valve 34, the coupling shaft portion 60B coupled to the valve guide 51 and an annular step portion 60C brought into contact with the valve guide 51 between the coupling tube portion 60A and the coupling shaft portion 60B.

The cap 60 is coupled to the valve 34 by fitting an inner periphery of the coupling tube portion 60A to an outer periphery of the coupling portion 34B of the valve 34 and holding an end surface of the coupling tube portion 60A in contact with a step portion 34C of the valve 34.

The valve guide 51 is coupled to the valve 34 via the cap 60. An end surface of the valve guide 51 is held in contact with the step portion 60C of the cap 60 by means of the spring force of the spring 39.

The coupling portion 34B of the valve 34 and the coupling shaft portion 60B of the cap 60 are formed so that outer diameters thereof are equal to each other. This makes it possible to directly couple the valve guide 51 to the coupling portion 34B of the valve 34 in a case where the cap 60 is omitted in accordance with the specifications of the exhaust valve 32.

According to the embodiment described above, the following effects can be achieved.

In the leveling valve 100, the moving region S in which the outer peripheral portion 51B of the valve guide 51 moves along the housing inner wall surface (the inner peripheral surface of the fourth hole 33D) into which the valve guide 51 is slidably inserted is set to the position offset from the communication port 53 in the axial direction. This makes it possible to avoid the outer peripheral portion 51B of the valve guide 51 sliding in contact with the housing inner wall surface (the inner peripheral surface of the fourth hole 33D) from interfering with the communication port 53 during an opening or closing operation, whereby the leveling valve 100 can be smoothly opened or closed.

Further, since the cap 60 is provided to separate the valve body portion 34A of the valve 34 from the valve guide 51 in the axial direction in which the valve 34 moves, the moving region S can be offset from the communication port 53 in the axial direction without changing the opening position of the communication port 53.

Moreover, the leveling valve 100 includes the cap 60 interposed between the valve 34 and the valve guide 51, and the communication port 53 is arranged to face the outer periphery of the cap 60 at the valve closing position. This makes it possible to offset the moving region S with respect to the communication port 53 in the axial direction without changing the shapes of the valve 34 and the valve guide 51.

Further, the cap 60 includes the coupling tube portion 60A coupled to the valve 34, the coupling shaft portion 60B coupled to the valve guide 51, and the annular step portion 60C brought into contact with the valve guide 51 between the coupling tube portion 60A and the coupling shaft portion 60B. This makes it possible to set an offset amount of the moving region S with respect to the communication port 53 in accordance with a length of the coupling tube portion 60A in the axial direction.

Next, a second embodiment will be described.

Figure 6:
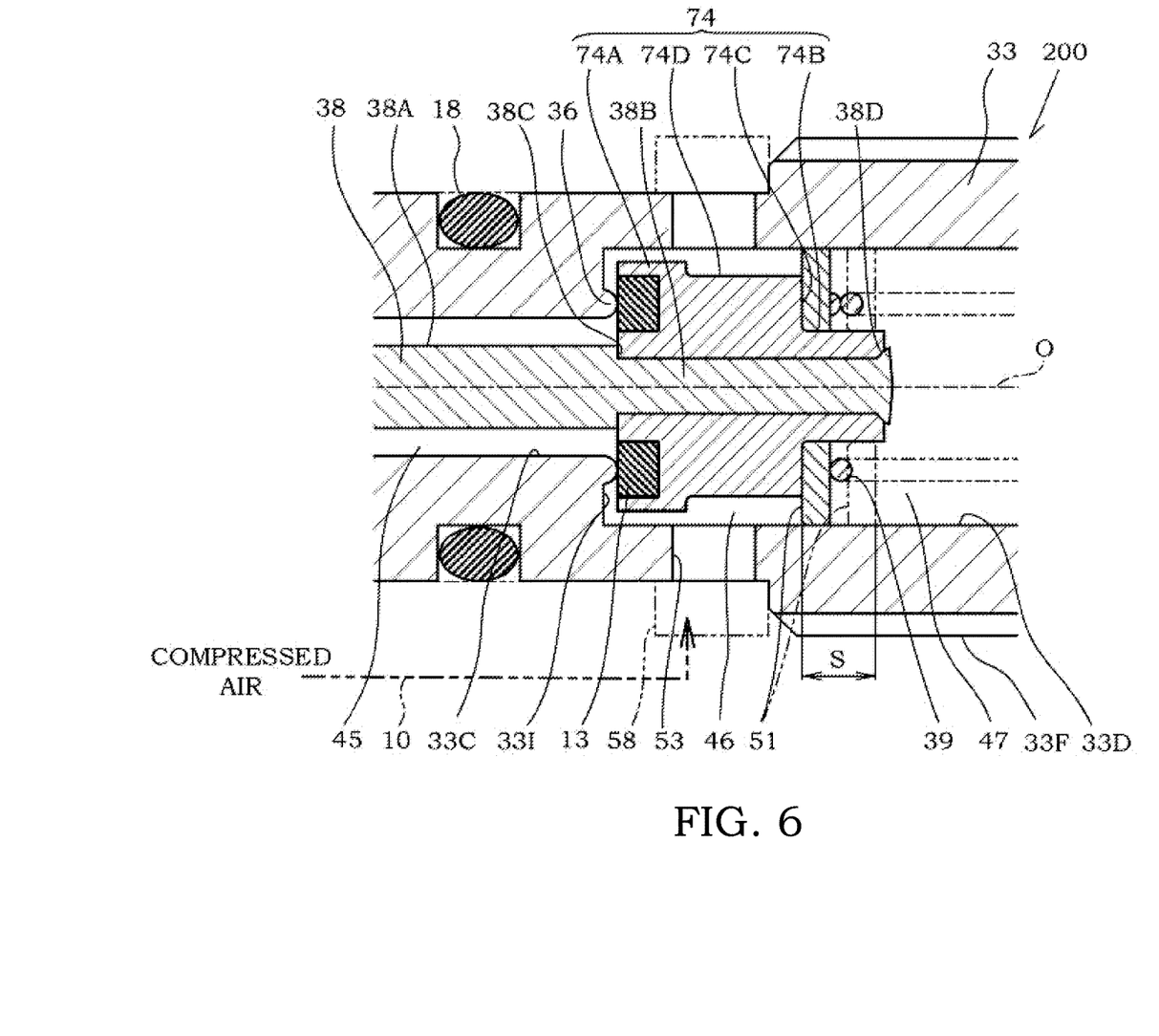
FIG. 6 is a cross-sectional view of an exhaust valve of a leveling valve according to a second embodiment of the present invention.

FIG. 6 is a cross-sectional view of an exhaust valve 32 of a leveling valve 200 according to the present embodiment. Points of difference from the first embodiment will mainly be described below. The same components as those of the leveling valve 100 according to the first embodiment are denoted by the same reference numerals, and explanation thereof will be omitted.

The cap 60 is interposed between the valve 34 and the valve guide 51 in the leveling valve 100 according to the first embodiment. However, in the leveling valve 200 according to the present embodiment, a supporting portion 74D is provided in a valve 74 as a valve guide separating mechanism for separating a valve guide 51 from a valve body portion 74A and supporting the valve guide 51 without using the cap 60.

The valve 74 includes the disk-shaped valve body portion 74A brought into contact with a seat portion 36, a hollow cylindrical coupling portion 74B to which the valve guide 51 is coupled, and the hollow cylindrical supporting portion 74D provided between the valve body portion 74A and the coupling portion 74B. The valve body portion 74A, the coupling portion 74B and the supporting portion 74D are integrally formed.

One end surface of the valve guide 51 is held in contact with a spring 39, and the other end surface thereof is held in contact with an end portion (a step portion 74C) of the supporting portion 74D of the valve 74 by means of a spring force of the spring 39.

Since the supporting portion 74D is provided substantially in the center of the valve 74, the position of the valve guide 51 is separated toward a side opposite to the seat portion 36 (right side in FIG. 6). A moving region S in which an outer peripheral portion 51B of the valve guide 51 moves is offset from an opening end of a communication port 53 in an axial direction by arbitrarily setting a length of the supporting portion 74D in the axial direction.

In a case where the valve 74 is located at a valve closing position where the valve 74 is in contact with the seat portion 36, the communication port 53 faces the disk-shaped valve body portion 74A brought into contact with an outer periphery of the seat portion 36 and an outer periphery of the supporting portion 74D.

According to the embodiment described above, the following effect can be achieved.

In the leveling valve 200, the valve 74 includes the valve body portion 74A brought into contact with the seat portion 36 and the supporting portion 74D extending in the axial direction from the valve body portion 74A and supporting the valve guide 51. The communication port 53 is arranged so as to face the outer periphery of the supporting portion 74D at the valve closing position. This makes it possible to offset the moving region S with respect to the communication port 53 in the axial direction without changing the shape of the valve guide 51.

Next, a third embodiment will be described.

Figure 7:
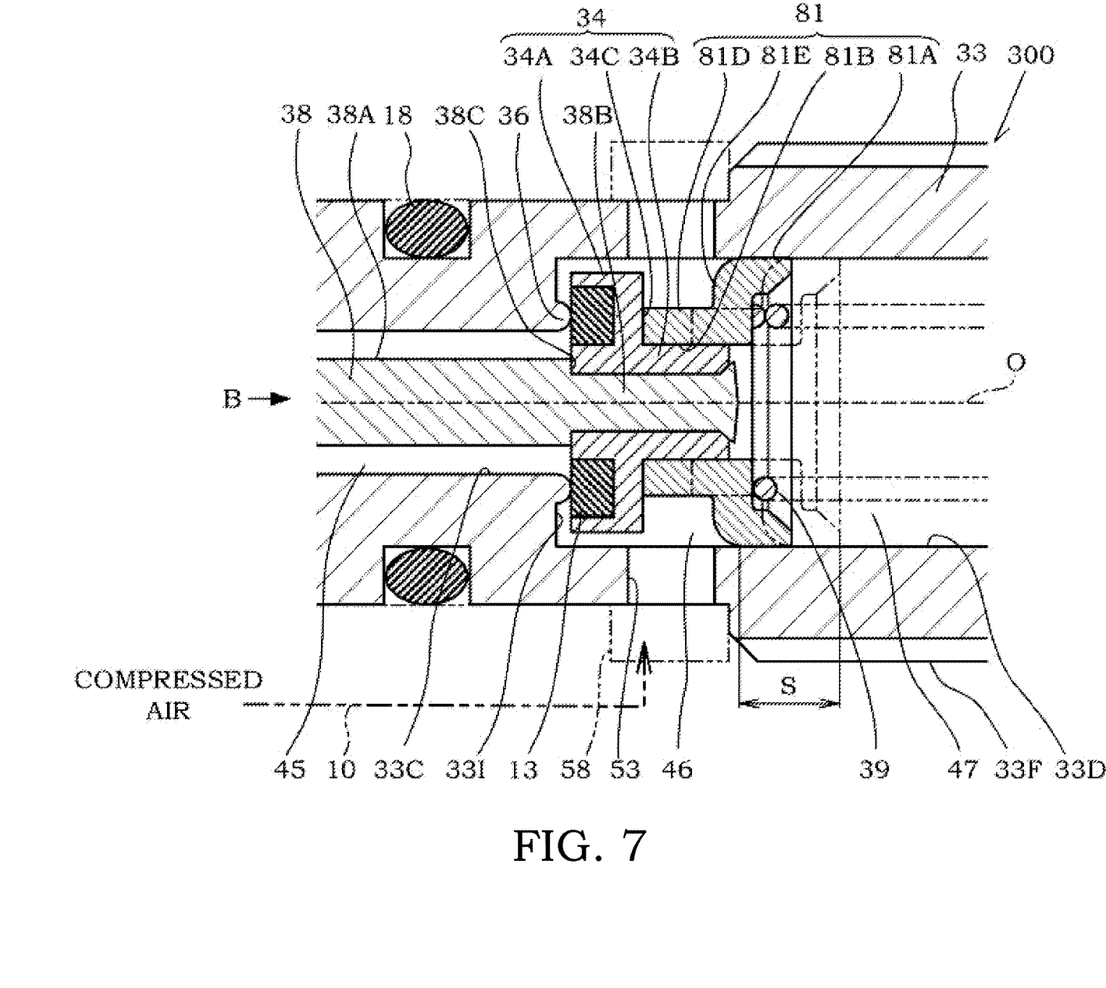
FIG. 7 is a cross-sectional view of an exhaust valve of a leveling valve according to a third embodiment of the present invention.
Figure 8:
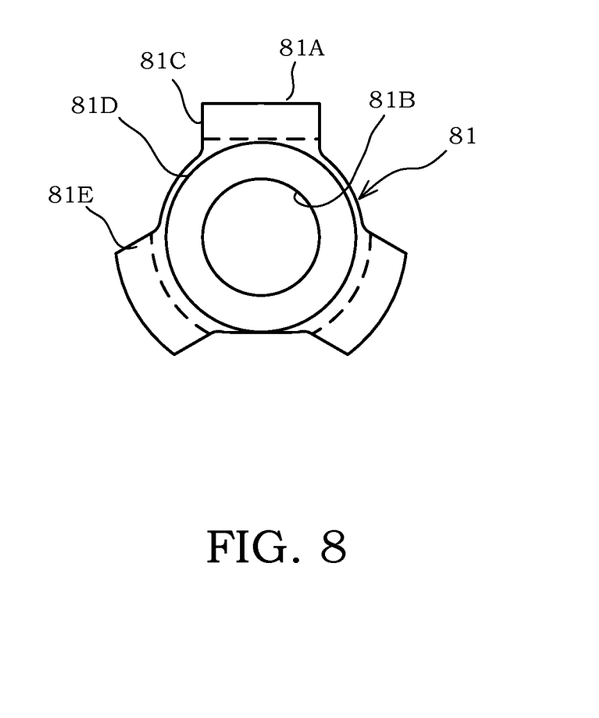
FIG. 8 is a side view of a valve guide when viewed from a direction of an arrow B in FIG. 7.

FIG. 7 is a cross-sectional view of an exhaust valve 32 of a leveling valve 300 according to the present embodiment. FIG. 8 is a side view of a valve guide 81 when viewed from a direction of an arrow B in FIG. 7. Points of difference from the first embodiment will mainly be described below. The same components as those of the leveling valve 100 according to the first embodiment are denoted by the same reference numerals, and explanation thereof will be omitted.

The cap 60 is interposed between the valve 34 and the valve guide 51 in the leveling valve 100 according to the first embodiment. However, in the leveling valve 300 according to the present embodiment, a leg portion 81D is provided in the valve guide 81 as a valve guide separating mechanism for separating an outer peripheral portion 81A from a valve body portion 34A of a valve 34 and supporting an outer peripheral portion 81A in place of the cap 60.

FIG. 8 is a side view of the valve guide 81 when viewed from the direction of the arrow B in FIG. 7. The valve guide 81 includes the hollow cylindrical leg portion 81D, a coupling hole 81B, a jaw portion 81E, an outer peripheral portion 81A of the jaw portion 81E, and a plurality of notches 81C. The leg portion 81D extends in an axial direction. The coupling hole 81B is opened to the inside of the leg portion 81D and coupled to the valve 34. The jaw portion 81E radially spreads from the leg portion 81D. The outer peripheral portion 81A of the jaw portion 81E is configured to slide along a fourth hole 33D of a housing 33. Each of the plurality of notches 81C is opened on the outer peripheral portion 81A. The leg portion 81D, the coupling hole 81B, the jaw portion 81E, the outer peripheral portion 81A and the notches 81C are integrally formed.

An inner periphery of the coupling hole 81B of the valve guide 81 is fitted to an outer periphery of the coupling portion 34B of the valve 34. An end surface of the jaw portion 81E is held in contact with a spring 39, and an end surface of the leg portion 81D of the valve guide 81 is held in contact with a step portion 34C (rear surface of the valve body portion 34A) of the valve 34 by means of a spring force of the spring 39.

The leg portion 81D is provided so as to extend in the axial direction between the valve body portion 34A of the valve 34 and the outer peripheral portion 81A of the valve guide 81, whereby a position of the outer peripheral portion 81A of the valve guide 81 is separated toward a side opposite to a seat portion 36 (right side in FIG. 7). A moving region S in which the outer peripheral portion 81A of the valve guide 81 moves is offset from an opening end of a communication port 53 in the axial direction by arbitrarily setting a length of the leg portion 81D in the axial direction.

In a case where the valve 34 is located at a valve closing position where the valve 34 is in contact with the seat portion 36, the communication port 53 faces an outer periphery of the valve body portion 34A of the valve 34 and an outer periphery of the leg portion 81D.

According to the above embodiment, the following effect can be achieved.

In the leveling valve 300, the valve guide 81 includes the leg portion 81D extending in the axial direction and coupled to the valve 34. The communication port 53 is arranged so as to face the outer periphery of the leg portion 81D at the valve closing position. This makes it possible to offset the moving region S from the communication port 53 in the axial direction without changing the shape of the valve 34.

Next, a fourth embodiment will be described.

Figure 9:
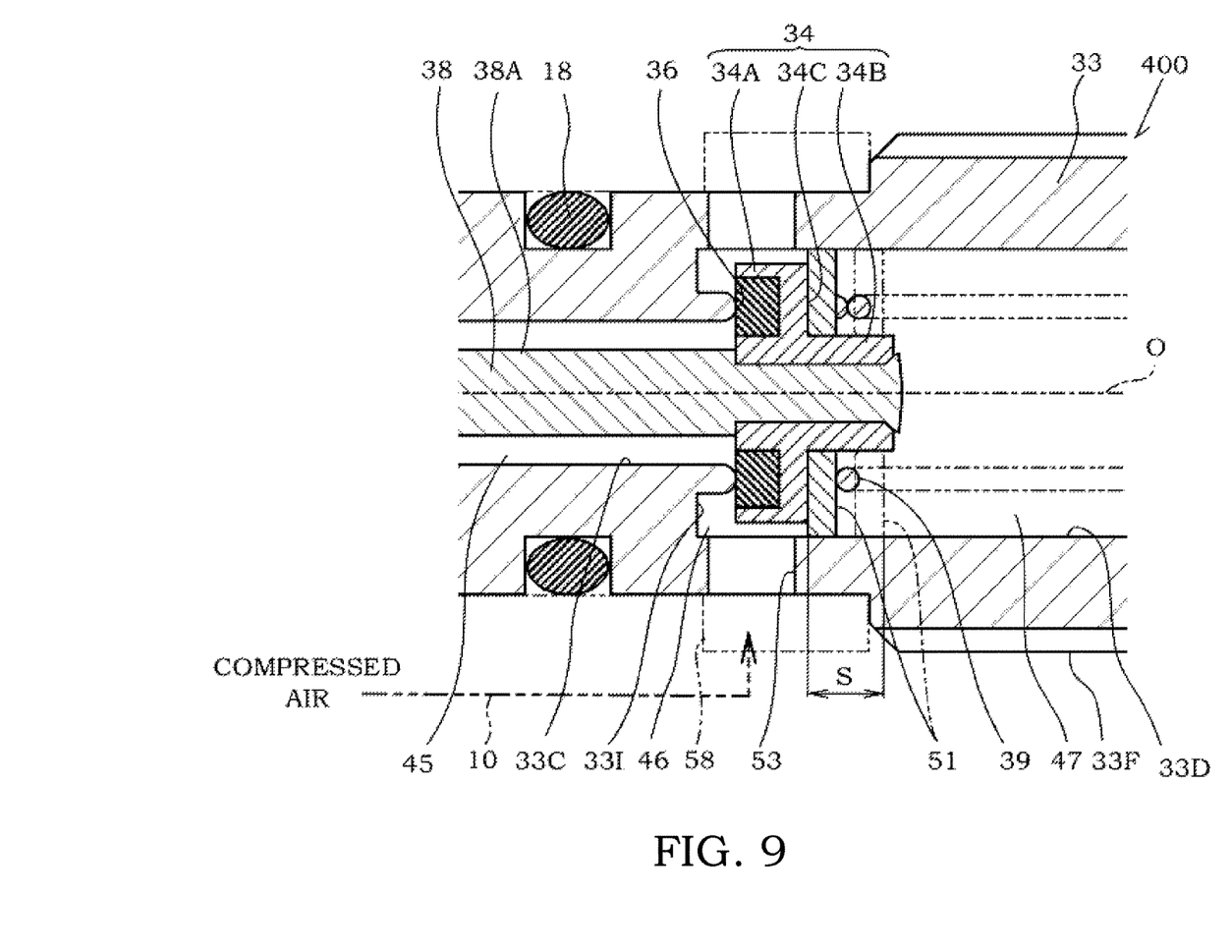
FIG. 9 is a cross-sectional view of an exhaust valve of a leveling valve according to a fourth embodiment of the present invention.

FIG. 9 is a cross-sectional view of an exhaust valve 32 of a leveling valve 400 according to the present embodiment. Points of difference from the first embodiment will mainly be described below. The same components as those of the leveling valve 100 of the first embodiment are denoted by the same reference numerals, and explanation thereof will be omitted.

The cap 60 is interposed between the valve 34 and the valve guide 51 in the leveling valve 100 according to the first embodiment. However, in the leveling valve 400 according to the present embodiment, arrangement of a communication port 53 is changed without using the cap 60. The communication port 53 is arranged so as to face an outer periphery of a valve body portion 34A of a valve 34 and an outer periphery of a seat portion 36 in a case where the valve 34 is located at a valve closing position where the valve 34 is in contact with the seat portion 36.

A moving region S in which an outer peripheral portion 51A of a valve guide 51 moves is offset from an opening end of the communication port 53 in the axial direction by arbitrarily setting a projecting height of the seat portion 36 in the axial direction with respect to a bottom portion 331 of a fourth hole 33D.

In a case where the valve 34 is located at a valve closing position where the valve 34 is in contact with the seat portion 36, the communication port 53 faces the outer periphery of the seat portion 36 and the outer periphery of the valve body portion 34A of the valve 34.

According to the above embodiment, the following effect can be achieved.

In the leveling valve 400, the seat portion 36 is formed in a ring shape so as to extend in the axial direction. The communication port 53 is arranged so as to face the outer periphery of the valve 34 and the outer periphery of the seat portion 36. This makes it possible to offset the moving region S from the communication port 53 in the axial direction without changing the shapes of the valve 34 and the valve guide 81.

The embodiments of the present invention have been described above, but the above embodiments are merely examples of application of the present invention, and the technical scope of the present invention is not limited to the specific configurations of the above embodiments.

The present application claims priority based on Japanese Patent Application No. 2013-038978 filed with the Japan Patent Office on Feb. 28, 2013, the entire content of which is incorporated into this specification by reference.

The invention claimed is:

1. A leveling valve for adjusting a height of an air cushion, the air cushion being provided between a vehicle body and a truck of a vehicle, the leveling valve comprising:
   a housing:
   a seat portion provided in the housing to define a flow passage, the flow passage communicating with the air cushion and a compressed air source or communicating with the air cushion and a drain;
   a valve body configured to move in an axial direction in the housing in accordance with a relative displacement of the vehicle body with respect to the truck;
   a spring configured to bias the valve body toward a closing side, the valve body being in contact with the seat portion in the closing side;
   a valve guide configured to support one end of the spring, the valve guide being independent from the valve body and slidable in the housing in a moving region in accordance with a movement of the valve body in the axial direction, the moving region being set to a position offset from the communication port in the axial direction; and a communication port penetrating a wall of the housing to allow a flow of compressed air between an interior and exterior of the housing.

2. The leveling valve according to claim 1, wherein the valve body includes a valve body portion brought into contact with the seat portion, and wherein the leveling valve further comprises a valve guide separating mechanism configured to separate the valve body portion of the valve body from the valve guide in the axial direction in which the valve body moves.

3. The leveling valve according to claim 2, wherein the valve guide separating mechanism includes a cap interposed between the valve body and the valve guide, and wherein the communication port is arranged to face an outer circumferential surface of the cap when the valve body is located at a valve closing position in which the valve body portion is in contact with the seat portion.

4. The leveling valve according to claim 2, wherein the valve guide includes a leg portion as the valve guide separating mechanism, the leg portion extending in the axial direction to be coupled to the valve body, and wherein the communication port is arranged to face an outer circumferential surface of the leg portion when the valve body is located at a valve closing position in which the valve body portion is in contact with the seat portion.

5. The leveling valve according to claim 1, wherein the valve body includes a valve body portion brought into contact with the seat portion, and the seat portion is formed in a ring-shaped manner so as to extend in the axial direction, and wherein the communication port is arranged to face an outer circumferential surface of the valve body and an outer circumferential surface of the seat portion when the valve body is located at a valve closing position in which the valve body portion is in contact with the seat portion.

6. The leveling valve according to claim 1, wherein the valve guide is inserted into the housing so as to be free to slide on an inner wall surface of the housing, and the communication port has an opening in the inner wall surface of the housing.

7. A leveling valve for adjusting a height of an air cushion, the air cushion being provided between a vehicle body and a truck of a vehicle, the leveling valve comprising:

a housing:

a seat portion provided in the housing to define a flow passage, the flow passage communicating with the air cushion and a compressed air source or communicating with the air cushion and a drain;

a valve body configured to move in an axial direction in the housing in accordance with a relative displacement of the vehicle body with respect to the truck;

a spring configured to bias the valve body toward a closing side, the valve body being in contact with the seat portion in the closing side;

a valve guide configured to support one end of the spring, the valve guide being independent from the valve body and slidable in the housing in a moving region in accordance with a movement of the valve body in the axial direction, the moving region being set to a position offset from the communication port in the axial direction; and a communication port penetrating a wall of the housing to allow a flow of compressed air between an interior and exterior of the housing, wherein the valve body includes a valve body portion brought into contact with the seat portion, the leveling valve further comprises a valve guide separating mechanism configured to separate the valve body portion of the valve body from the valve guide in the axial direction in which the valve body moves, the valve guide separating mechanism includes a cap interposed between the valve body and the valve guide, the communication port is arranged to face an outer circumferential surface of the cap when the valve body is located at a valve closing position in which the valve body portion is in contact with the seat portion, and the cap includes:
a coupling tube portion coupled to the valve body;
a coupling shaft portion coupled to the valve guide; and
a step portion configured to bring into contact with the valve guide between the coupling tube portion and the coupling shaft portion.

8. A leveling valve for adjusting a height of an air cushion, the air cushion being provided between a vehicle body and a truck of a vehicle, the leveling valve comprising:

a housing:

a seat portion provided in the housing to define a flow passage, the flow passage communicating with the air cushion and a compressed air source or communicating with the air cushion and a drain;

a valve body configured to move in an axial direction in the housing in accordance with a relative displacement of the vehicle body with respect to the truck;

a spring configured to bias the valve body toward a closing side, the valve body being in contact with the seat portion in the closing side;

a valve guide configured to support one end of the spring, the valve guide being independent from the valve body and slidable in the housing in a moving region in accordance with a movement of the valve body in the axial direction, the moving region being set to a position offset from the communication port in the axial direction; and a communication port penetrating a wall of the housing to allow a flow of compressed air between an interior and exterior of the housing, wherein the valve body includes a valve body portion brought into contact with the seat portion, the leveling valve further comprises a valve guide separating mechanism configured to separate the valve body portion of the valve body from the valve guide in the axial direction in which the valve body moves, the valve body includes a supporting portion as the valve guide separating mechanism, the supporting portion extending from the valve body portion in the axial direction to support the valve guide, and the communication port is arranged to face an outer circumferential surface of the supporting portion when the valve body is located at a valve closing position in which the valve body portion is in contact with the seat portion.

* * * * *